United States Patent

Wu

US 6,360,772 B1
Mar. 26, 2002

(54) MASS FLOW CONTROLLER

(75) Inventor: Hsiao-Che Wu, Hsinchu (TW)

(73) Assignee: Promos Technologies, Inc., Hsinchu (TW)

( * ) Notice: Subject to any disclaimer, the term of this patent is extended or adjusted under 35 U.S.C. 154(b) by 0 days.

(21) Appl. No.: 09/608,112

(22) Filed: Jun. 30, 2000

(51) Int. Cl.$^7$ .................................................. G05D 7/06

(52) U.S. Cl. ..................... 137/486; 137/487.5; 251/121; 251/129.06; 251/900

(58) Field of Search .............................. 137/486, 487.5; 251/121, 129.06, 900

(56) References Cited

U.S. PATENT DOCUMENTS 4,484,888 A * 11/1984 Grossiord et al. ...... 251/900 X
4,977,916 A * 12/1990 Ohmi et al. ......... 137/487.5 X

FOREIGN PATENT DOCUMENTS

SU          724867    * 3/1980    ............ 251/129.06

* cited by examiner

Primary Examiner—Gerald A. Michalsky
(74) Attorney, Agent, or Firm—Klein & Szekeres LLP

(57) ABSTRACT

A mass flow controller (MFC) for controlling the fluid flow in a conduit is configured to include a flow command input for issuing a flow control command, a control unit accepting the flow control command for generating a control signal, a flow-sensing device including a plurality of temperature sensors, a sensor circuit and an amplifier, an actuator being driven by the control unit, and a valve member including a valve being adjusted by the actuator for controlling the fluid flow in the conduit, a distortion controller being distorted in response to the control signal, and an elastic body being distorted in response to an external force resulting from the distortion of the distortion controller for changing the orifice size in the conduit. In addition, the valve can be designed to be fixed instead of being mobile so as to reduce the occurrence of particles resulting from the mutual frictions emerging among the moving parts employed in the valve member.

16 Claims, 5 Drawing Sheets

MASS FLOW CONTROLLER

FIELD OF THE INVENTION

The present invention relates to a mass flow controller (MFC) applied in a semiconductor fabrication process, and more particularly to a valve member employed in a MFC.

BACKGROUND OF THE INVENTION

Please refer to FIG. 1 showing a mass flow controller of the prior art. The control unit 10 accepts the flow control command issued by the flow command input 11 to drive the actuator 12 for adjusting the valve 13, thereby changing the output gas flow. The flow-sensing device 14 is composed of a plurality of temperature sensors 141, a sensor circuit 142, and an amplifier 143. The temperature of gas flowing in/out the conduit at different locations is measured by the temperature sensors 141. The sensor circuit 142 is used to transform the difference between the measured temperatures into an electric signal representing the substantial input gas flow. The electric signal is amplified by the amplifier 143 to an appropriate level and then be fed back to the control unit 10 to make a comparison with the magnitude of flow control command for the purpose of progressing a feedback control process.

Please refer to FIG. 2 showing a sectional plan of the valve member employed in a mass flow controller according to the prior art. The valve member is constituted by a valve 131 and a plurality of springs 132. The function of the metal thin film 21 is to ensure that the valve member is airtight, and the actuator 12 is separated from the valve 131 by a metal thin film 21 so as to compress the valve 131. The valve 131 and the actuator 12 are closely jointed by means of the restoration force of the springs 132. The position change of the valve 131 will adjust the area of gas flow at the position 22 in the conduit, therefore the gas flow is controlled. Nevertheless, since the total sectional area at position 22 is fixed, a maximum flow limitation is inevitably created. Moreover, the reliable range of flow control is mostly limited at 10% to 90% (e.g. full flow range 100 sccm). In case when certain semiconductor fabrication processes require a wide-range flow control, and the valve member can not meet the requirements of the semiconductor fabrication processes, a valve with a larger dimension is needed to be employed in order to satisfy the wide-range flow control purpose and thus leads to inconvenience.

Besides, because there are too many moving parts employed in the aforementioned valve member, numerous particles are inevitably generated due to the mutual frictions emerging among the moving parts (e.g. the friction between the metal thin film 21 and the valve 131, and the friction of the spring 132 itself). Accordingly, there arose a need to develop a novel valve member employed in a MFC that can get rid of the foregoing shortcomings encountered in the prior art and can be more feasible for the current semiconductor industry.

SUMMARY OF THE INVENTION

It is an object of the present invention to develop a mass flow controller for changing the orifice size in a conduit.

It is another object of the present invention to develop a mass flow controller for reducing the occurrence of particles.

It is an further object of the present invention to provide a valve member employed in a mass flow controller for changing the orifice size in a conduit.

The mass flow controller for controlling the fluid flow in a conduit according to the present invention includes a flow command input for issuing a flow control command, a control unit accepting the flow control command for generating a control signal, a flow-sensing device including a plurality of temperature sensors, a sensor circuit and an amplifier, an actuator being driven by the control unit, and a valve member including a valve being adjusted by the actuator for controlling the fluid flow in the conduit, a distortion controller being distorted in response to the control signal, and an elastic body being distorted in response to an external force resulting from the distortion of the distortion controller for changing the orifice size in the conduit.

In accordance with the present invention, the distortion controller is made of a piezoelectric material, and more preferably, a barium titanate.

In accordance with the present invention, the elastic body is ring-shaped and may be made of viton.

In accordance with the present invention, the elastic body is inlayed on the wall of the conduit.

In accordance with the present invention, the actuator and the valve are separated by a metal thin film.

Another aspect of the present invention is a mass flow controller for controlling the fluid flow in a conduit and reducing the occurrence of particles, including: a flow command input for issuing a flow control command, a control unit accepting the flow control command for generating a control signal, a flow-sensing device including a plurality of temperature sensors, a sensor circuit and an amplifier, and a valve member including a fixed valve, a distortion controller being distorted in response to the control signal, and an elastic body being distorted in response to an external force resulting from the distortion of the distortion controller for changing the orifice size in the conduit.

Another further aspect of the present invention is a valve member employed in a mass flow controller (MFC) for changing the orifice in a conduit, including: a valve for controlling the fluid flow in the conduit, a distortion controller being distorted in response to a control signal, and an elastic body being distorted in response to an external force resulting from the distortion of the distortion controller for changing the orifice size in the conduit.

Preferably, the distortion controller is made of a piezoelectric material, such as a barium titanate.

Preferably, the elastic body is ring-shaped and may be made of viton.

In accordance with another further aspect of the present invention, the elastic body is inlayed on the wall of the conduit.

Another yet aspect of the present invention is a valve member employed in a mass flow controller (MFC) for changing the orifice size in a conduit and reducing the occurrence of particles, including: a fixed valve, a distortion controller being distorted in response to a control signal, and an elastic body being distorted in response to an external force resulting from the distortion of the distortion controller for changing the orifice size in the conduit.

Now the foregoing and the features of the present invention may best be understood through the following descriptions with reference to the accompanying drawings, in which:

DETAILED DESCRIPTION OF THE PREFERRED EMBODIMENTS

Figure 1:
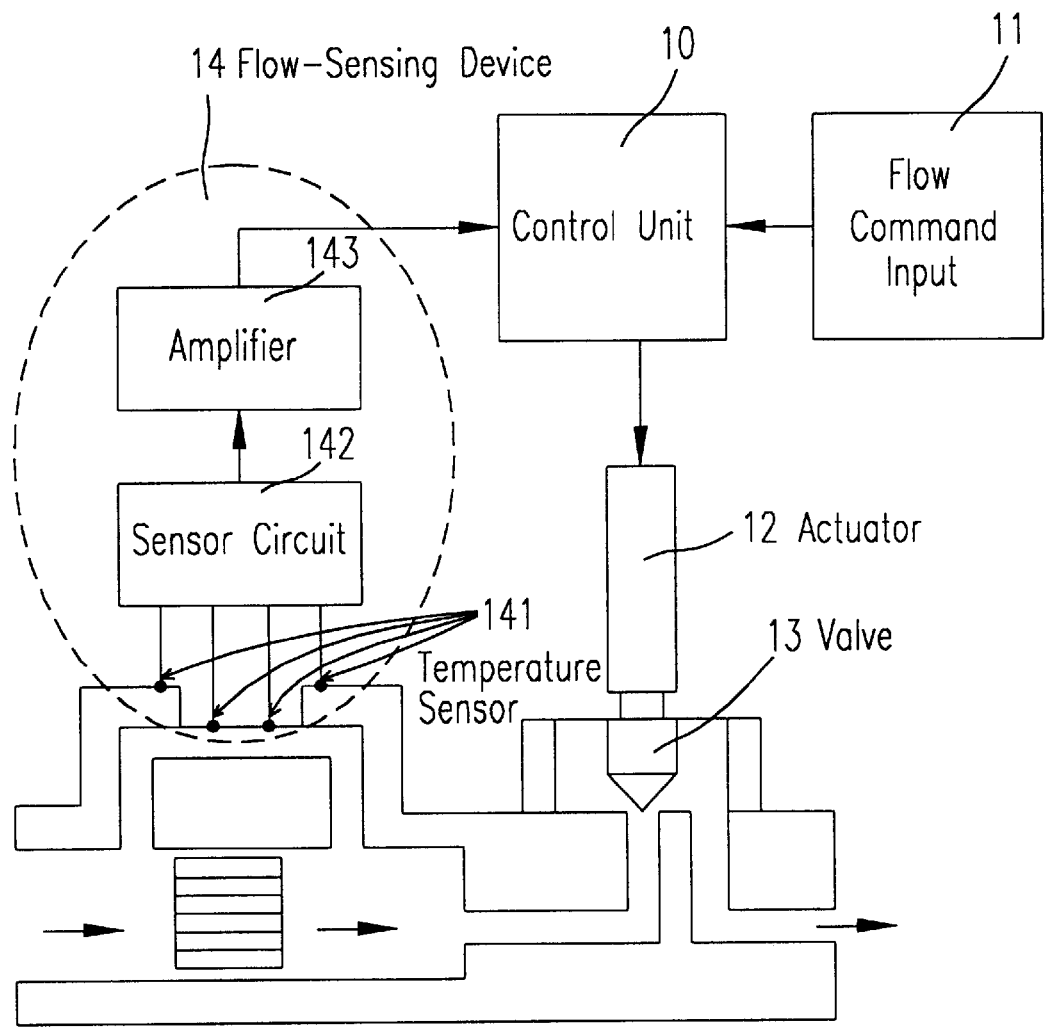
FIG. 1 shows a mass flow controller (MFC) of the prior art.
Figure 2:
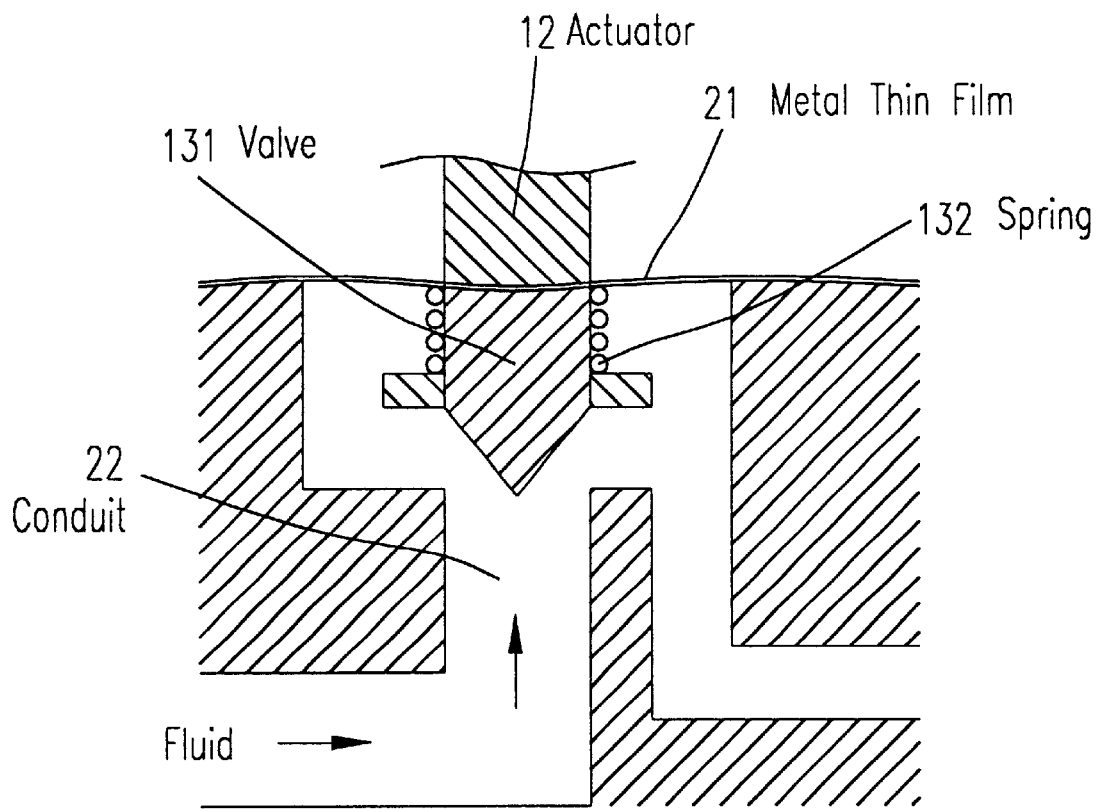
FIG. 2 shows the valve member employed in a MFC according to the prior art.
Figure 3:
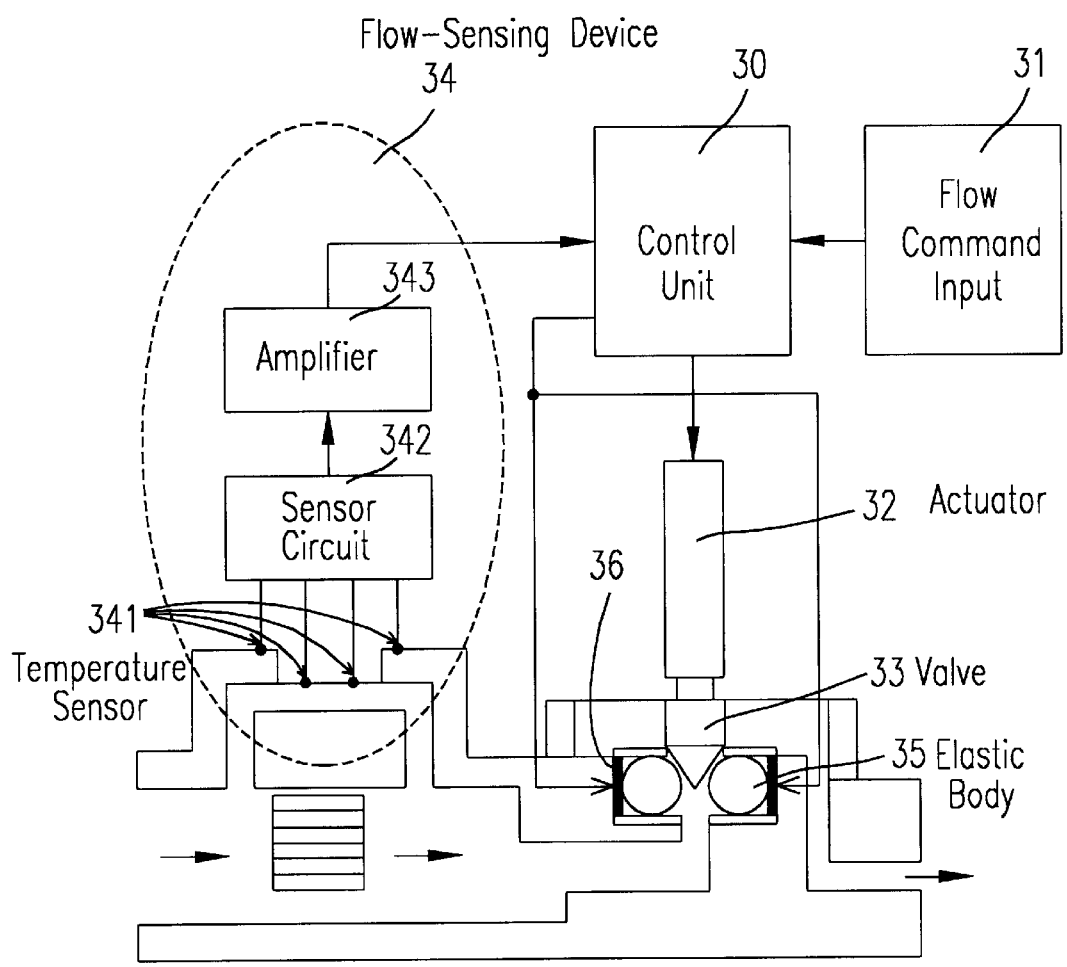
FIG. 3 shows a preferred embodiment of the mass flow controller according to the present invention.

Please refer to FIG. 3 showing a preferred embodiment of the mass flow controller according to the present invention. The control unit 30 accepts the flow control command issued by the flow command input 31 to drive the actuator 32 for adjusting the valve 33, thereby changing the output gas flow. The flow-sensing device 34 is composed of a plurality of temperature sensors 341, a sensor circuit 342 and an amplifier 343. The temperature of gas flowing in/out the conduit at different locations is measured by the temperature sensors 341. The sensor circuit 342 is used to transform the difference of measured temperatures into an electric signal representing the substantial input gas flow. The electric signal is amplified by the amplifier 343 to an appropriate level and then be fed back to the control unit 10 to make a comparison with the magnitude of flow control command for the purpose of progressing a feedback control process.

Figure 4A:
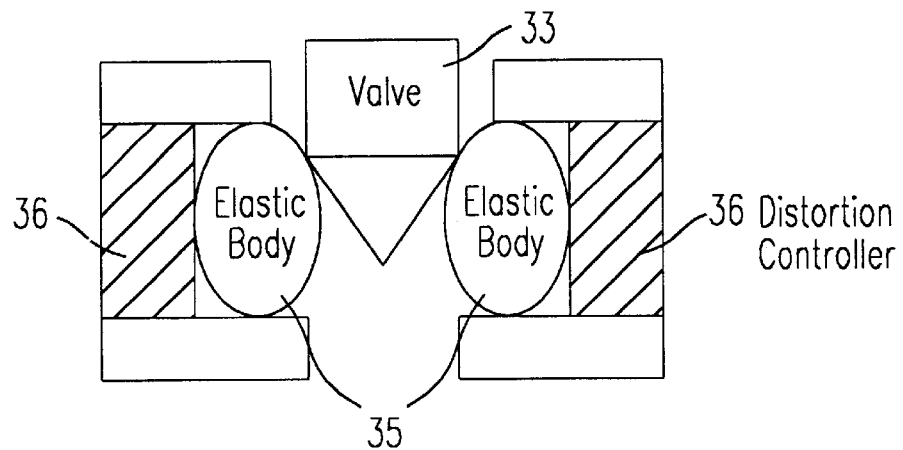
FIGS. 4 (a)–(c) illustrates the actions between the elastic body and the distortion controller according to the present invention.
Figure 4B:
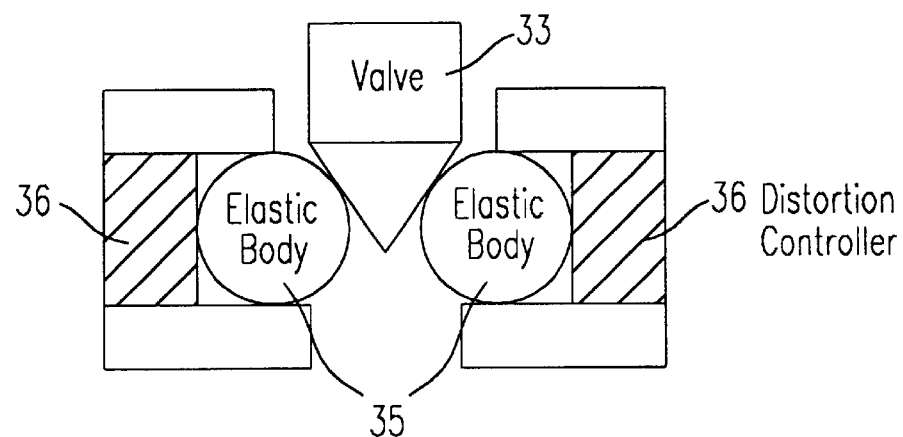
Figure 4C:
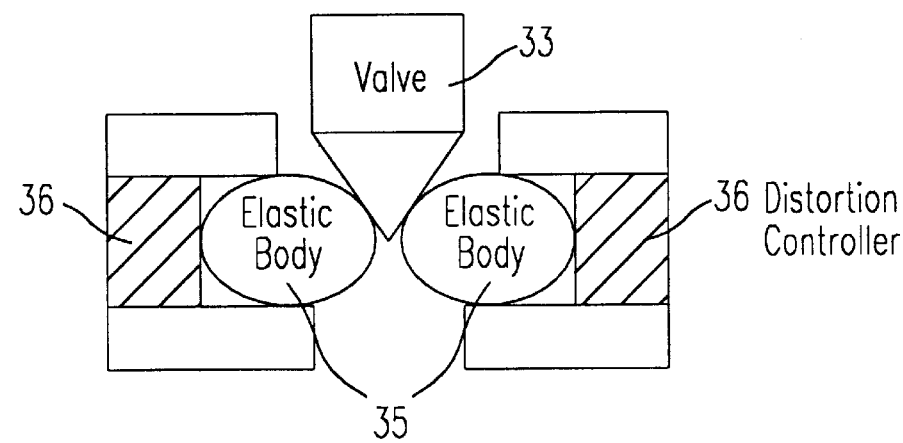

It is worthy to note that the characteristic of the present invention is emphasized on the installation of the elastic body 35 and the distortion controller 36. The elastic body 35 is inlayed on the wall of the conduit and is distorted by an external force resulting from the distortion controller 36, thereby changing the orifice size in the conduit. Please refer to FIGS. 4(a)–(c) illustrating the actions between the elastic body 35 and the distortion controller 36 according to the present invention. The elastic body 35 is ring-shaped like a doughnut and may be made of viton. The distortion controller 36 is a piezoelectric element for squeezing the ring-shaped elastic body 35 and may be made of barium titanate. The distortion controller 36 is controlled by the control signal generated by the control unit 30 to cause its volume to be changed, thereby enabling the elastic body 35 to be in the states of extension, normal and compression as respectively shown in FIG. 4(a), FIG. 4(b), and FIG. 4(c). Thus, the orifice size in the conduit can be changed effectively. The maximum flow limitation can be relaxed by the position change of the valve 33. Also, the reliable range of flow control is increased and the valve member does not need to be replaced along with the requirements of the semiconductor fabrication process.

Figure 5:
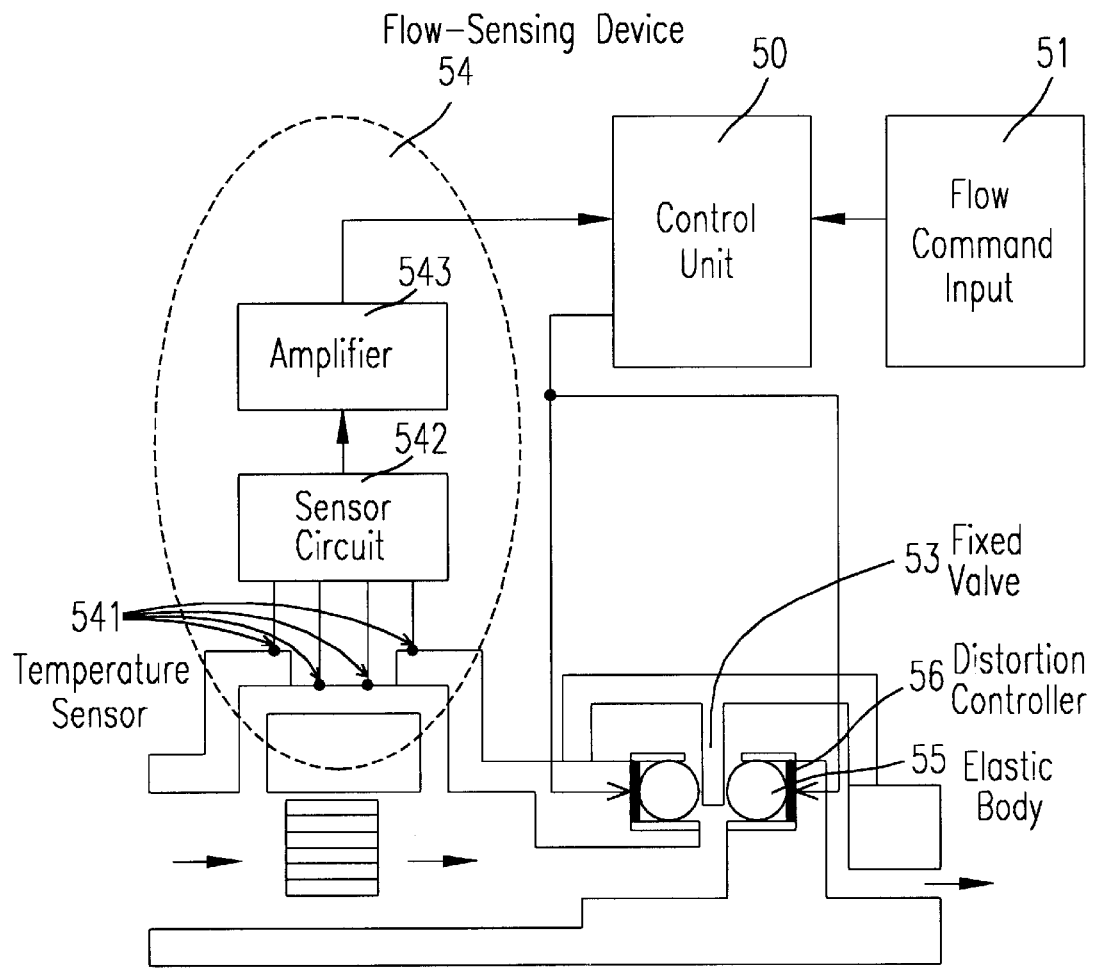
FIG. 5 shows another preferred embodiment of the mass flow controller according to the present invention.

Please refer to FIG. 5 showing another preferred embodiment of the mass flow controller according to the present invention. The valve member 53 of the embodiment is fixed instead of being mobile. Consequently, the control unit 50 accepts the flow control command issued by the flow command input 51 to drive the distortion controller 56 to generate an external force only for the purpose of changing the volume of the elastic body 55 and thus changing the orifice size in the conduit. The flow-sensing device 54 is identical to that of the previous embodiment, and we will not have a further discussion herein. Because most of the moving parts employed in the valve member are disappeared, the occurrence of the particles is reduced. With respect to the distortion controller, it can also be implemented with an electromagnetic element.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A mass flow controller (MFC) for controlling the fluid flow in a conduit having an orifice, comprising:

a flow command input for issuing a flow control command;

a control unit accepting said flow control command for generating a control signal;

a flow-sensing device;

said flow-sensing device including a plurality of temperature sensors for measuring the temperatures of said fluid flowing in/out said conduit at different locations, a sensor circuit for transforming the difference of measured temperatures into an electric signal, and an amplifier for amplifying said electric signal to an appropriate level;

an actuator being driven by said control unit;

a valve member;

said valve member including a valve being adjusted by said actuator for controlling said fluid flow in said conduit, a distortion controller being distorted in response to said control signal, and an elastic body being distorted in response to an external force resulting from the distortion of said distortion controller for changing the size of said orifice in said conduit.

2. A mass flow controller according to claim 1 wherein said distortion controller is made of a piezoelectric material.

3. A mass flow controller according to claim 2 wherein said piezoelectric material is a barium titanate.

4. A mass flow controller according to claim 1 wherein said elastic body is ring-shaped.

5. A mass flow controller according to claim 1 wherein said elastic body is made of viton.

6. A mass flow controller according to claim 1 wherein said elastic body is inlayed on the wall of said conduit.

7. A mass flow controller according to claim 1 wherein said actuator and said valve are separated by a metal thin film.

8. A mass flow controller (MFC) for controlling the fluid flow in a conduit having an orifice, and reducing the occurrence of particles, comprising:

a flow command input for issuing a flow control command;

a control unit accepting said flow control command for generating a control signal;

a flow-sensing device;

said flow-sensing device including a plurality of temperature sensors for measuring the temperatures of said fluid flowing in/out said conduit at different locations, a sensor circuit for transforming the difference of measured temperatures into an electric signal, and an amplifier for amplifying said electric signal to an appropriate level;

a valve member;

said valve member including a fixed valve, a distortion controller being distorted in response to said control signal, and a ring-shaped elastic body being distorted in an axial direction in response to an external force resulting from the distortion of said distortion controller for changing the size of said orifice in said conduit.

9. A valve member employed in a mass flow controller (MFC) for changing the size of an orifice in a conduit, comprising:

a valve for controlling the fluid flow in said conduit;

a distortion controller being distorted in response to a control signal and made of a piezoelectric material; and a ring-shaped elastic body being distorted in an axial direction in response to an external force resulting from the distortion of said distortion controller for changing said orifice size in said conduit.

10. A valve member according to claim 9 wherein said piezoelectric material is barium titanate.

11. A valve member according to claim 9 wherein said elastic body is made of viton.

12. A valve member according to claim 9 wherein said elastic body is inlayed on the wall of said conduit.

13. A valve member employed in a mass flow controller (MFC) for changing the size of an orifice in a conduit and reducing the occurrence of particles, comprising:

a fixed valve;

a distortion controller being distorted in response to a control signal and made of a piezoelectric material; and a ring-shaped elastic body being distorted in an axial direction in response to an external force resulting from the distortion of said distortion controller for changing said orifice size in said conduit.

14. A valve member according to claim 13 wherein said piezoelectric material is barium titanate.

15. A valve member according to claim 13 wherein said elastic body is made of viton.

16. A valve member according to claim 13 wherein said elastic body is inlayed on the wall of said conduit.

* * * * *